United States Patent [19]

Hara et al.

[11] 4,054,476
[45] Oct. 18, 1977

[54] METHOD AND APPARATUS FOR FABRICATING NON-VULCANIZED PNEUMATIC RUBBER FENDERS

[75] Inventors: Yoshiaki Hara; Yusaku Waki; Yasuo Minai, all of Hiratsuka; Katumi Nakamura, Isehara, all of Japan

[73] Assignee: The Yokohama Rubber Co., Ltd., Tokyo, Japan

[21] Appl. No.: 643,132

[22] Filed: Dec. 22, 1975

[51] Int. Cl.$^2$ .............................................. B63B 59/02
[52] U.S. Cl. .................................. 156/191; 114/219; 156/123 R; 156/394; 156/400
[58] Field of Search ............... 156/110 R, 118, 123 R, 156/145, 146, 147, 155, 156, 287, 394 R, 401, 402, 408–411, 414, 421, 446, 184, 187, 188, 190, 191, 218, 443, 444, 469; 114/219, 220; 14/76; 293/60, 71 P

[56] References Cited

U.S. PATENT DOCUMENTS

| | | | |
|---|---|---|---|
| 2,871,912 | 2/1959 | Kraft | 156/126 |
| 2,936,023 | 5/1960 | Giletta et al. | 156/410 |
| 2,981,310 | 4/1961 | Frohlich et al. | 156/400 |
| 3,070,478 | 12/1962 | Riddle | 156/126 |
| 3,078,204 | 2/1963 | Appleby | 156/401 |
| 3,152,031 | 10/1964 | NeBout | 156/401 |
| 3,258,383 | 6/1966 | Sabo et al. | 156/410 |
| 3,438,832 | 4/1969 | Cantarutti | 156/401 |
| 3,704,189 | 11/1972 | Varga | 156/110 R |
| 3,772,125 | 11/1973 | Leblond | 156/402 |

*Primary Examiner*—Charles E. Van Horn
*Assistant Examiner*—John E. Kittle
*Attorney, Agent, or Firm*—Armstrong, Nikaido & Marmelstein

[57] ABSTRACT

Process and apparatus for fabricating a pneumatic rubber fender comprising a cylindrical body of a combination of a plurality of rubber and reinforced rubber layers, both of the terminal ends of which are closed so that compressed air can be sealed therein. In the fabrication process, the cylindrical body of a non-vulcanized rubber fender, one end of which is closed by a first end plate, is firstly formed on a fabrication drum provided with a cylindrical portion and an end plate portion closing one end of the cylindrical portion. The connection of a second end plate with an opened free end of the above-mentioned cylindrical body of the non-vulcanized rubber fender is carried out in such a condition that the above-mentioned opened free end is turned back while the cylindrical body of the non-vulcanized rubber fender is mounted on the fabrication drum. After completion of the above-mentioned connecting operation, the non-vulcanized rubber fender is withdrawn from the fabrication drum and thereafter subjected to the vulcanizing operation.

10 Claims, 31 Drawing Figures

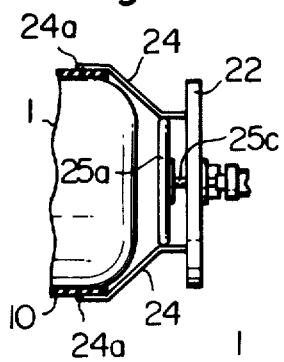
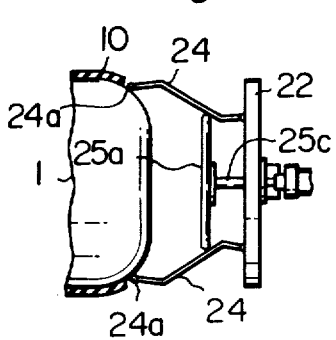
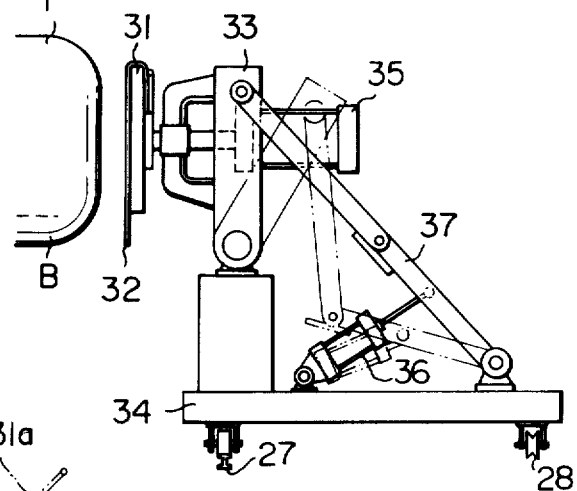
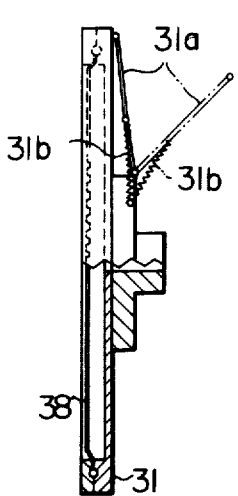
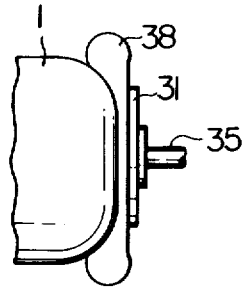

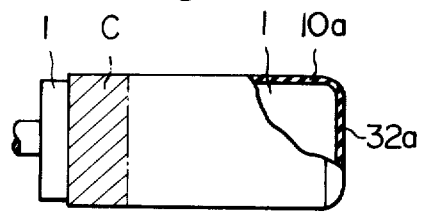
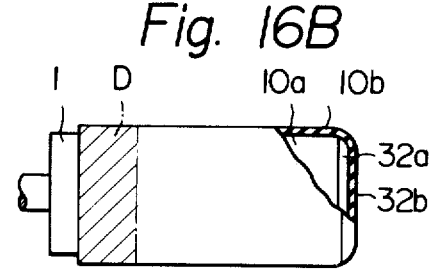
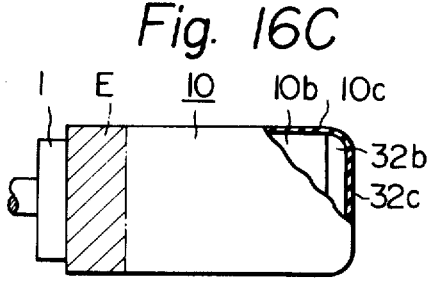
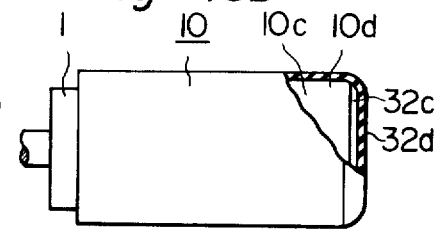
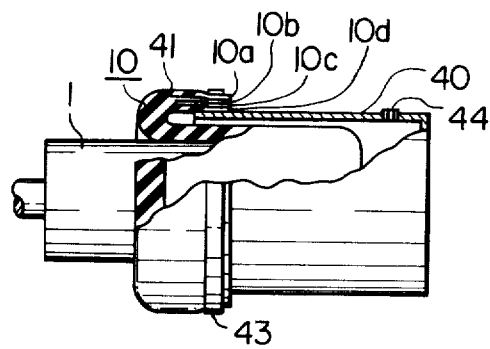
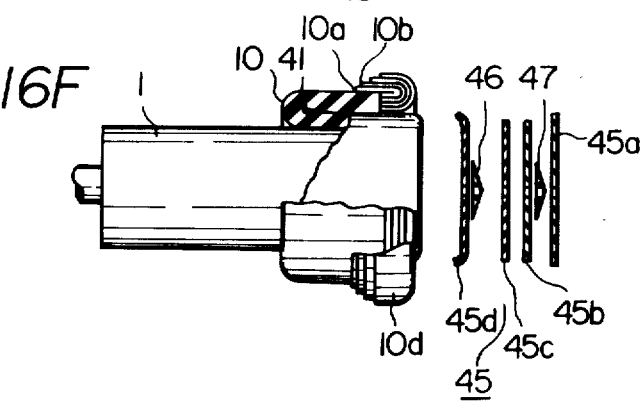

METHOD AND APPARATUS FOR FABRICATING NON-VULCANIZED PNEUMATIC RUBBER FENDERS

SUMMARY OF THE INVENTION

This invention relates to a process for fabricating pneumatic rubber fenders comprising a cylindrical body composed of a combination of a plurality of rubber and reinforced rubber layers, both of the terminal ends of which are closed so that compressed air can be sealed therein, and to an apparatus for carrying out this process. Pneumatic fenders of this type have heretofore been made by a process comprising forming a paper mold having the same shape and size as that of the intended product, winding a non-vulcanized rubber sheet and a reinforcement on this paper mold and vulcanizing the assembly integrally; or by a process comprising winding a vulcanized sheet of a combination of rubber and a reinforcement on such paper mold to effect the molding. In each of these conventional processes, however, it is necessary to utilize both a hand lapping operation and an operation of removing the paper mold left in the interior of the molded product by way of an air supply hole or the like. These operations are very complicated and troublesome and reduce the manufacturing efficiency. Further, the paper mold used should be thrown away every time one product is produced and this, of course, results in a high manufacturing cost.

It is, therefore, a principle object of the present invention to provide a process for fabricating a pneumatic rubber fender by which the foregoing defects involved in the conventional techniques can be eliminated, the molding operation is substantially mechanized and it is not necessary to thrown away a paper mold every time one product is fabricated.

Another object of the present invention is to provide an apparatus for carrying out the above process conveniently.

To attain the purpose of the present invention, in the fabricating process for producing a non-vulcanized pneumatic rubber fender, a cylindrical body portion of the rubber fender provided with a first end plate portion, which closes an end of the body portion, is firstly formed on a cylindrical drum provided with a closed end plate portion. Thereafter a turn-back cylindrical case is mounted on the cylindrical body portion from a side of the closed end portion of the cylindrical body portion so as to turn back a free end portion of the above-mentioned cylindrical body portion onto a free edge of the turn-back case. Next, the turned back portion of the cylindrical body portion is tightly clamped on the turn back case so as to effectively assure air tightness of the inside chamber thereof and compressed air is supplied into the inside chamber of the turn back case. Consequently, the turned back case is relatively displaced away from the closed end plate portion of the drum together with the turned back portion of the cylindrical body portion. After releasing the above-mentioned clamping and removing the turn-back case from the cylindrical body portion, a second end plate portion of the rubber fender is formed in such a way that a previously prepared sheet material provided with a central aperture for holding a mouth piece is connected to the above-mentioned turned back portion of the cylindrical body of the rubber fender by a press-bonding operation. In the above-mentioned operation for connecting the second end plate portion to the turned back portion, a mouth piece is also attached to the second end plate portion. After completion of the above-mentioned operation, compressed air is supplied into a chamber of the cylindrical body portion which is now closed at both end portions by the first and second end plates, so that the non-vulcanized rubber fender is removed the drum.

The above-mentioned process is mainly carried out mechanically by utilizing a material supply device which supplies sheet materials, such as rubber sheets and rubber coated reinforced cord fabrics, to the above-mentioned drum; a stitching device for forming a cylindrical body portion of the rubber fender; a squeezing device and centering device for forming end plate portions of the rubber fender, and; a turn back case for turning back opened edge portions of the cylindrical portion. As mentioned above, the problems, which are discussed hereinbefore, are preferably solved by applying the method and apparatus according to the present invention.

BRIEF EXPLANATION OF THE DRAWINGS

FIG. 12A is a schematic side view of a part of the squeezing device shown in FIG. 9 in an operating condition;

FIG. 12B is also a schematic side view of the same part of the squeezing device shown in FIG. 12A, in another operating condition;

FIG. 13 is a side view of a centering device shown in FIG. 1;

FIG. 14 is an enlarged side view showing the vertical section of the main part of the centering device shown in FIG. 13;

FIG. 15 is a view illustrating the operation of the centering device;

FIGS. 16A to 16H are explanatory views showing the process for fabricating the pneumatic rubber fender according to the present invention;

DETAILED EXPLANATION OF THE INVENTION

Figure 1:
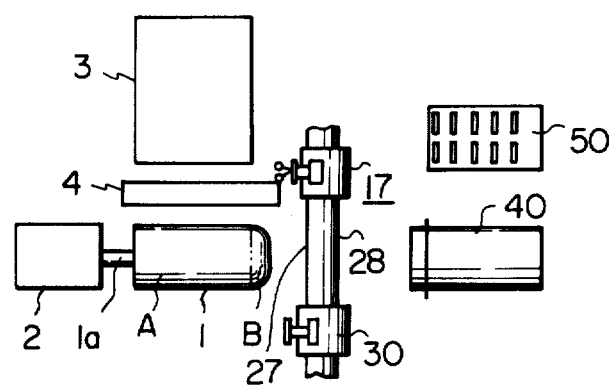
FIG. 1 is a schematic plan view of the apparatus according to the present invention, wherein the arrangement of the component devices thereof is shown.
Figure 2:
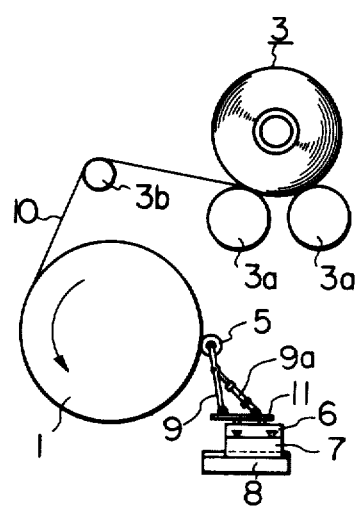
FIG. 2 is a schematic side view of the stitching device shown in FIG. 1.

Referring now to FIG. 1, showing the lay-out of the apparatus of the present invention, a drum 1, a driving device 2, a material feed device 3, a stitching device 4, a squeezing device 17, a centering device 30, a turn-back case 40 and a product receiving stand 50, are shown. The drum 1 comprises a cylindrical portion A having an outer diameter smaller than the diameter of the final product and an end plate portion B having such an end surface as will not form wrinkles on the final product. The drum 1 is connected on the side opposite the side of the end plate portion B to one end of a shaft 1a of the driving mechanism 2 such as a power transmission unit including in combination a motor and a belt and supported thereon in a cantilever condition. The material feed device 3 comprises a pair of rolls 3a turnably arranged in parallel condition to each other and a guide roll 3b disposed above the drum 1 as shown in FIG. 2. The axial centers of these rolls 3a, 3b are disposed in parallel condition to the axial center of the drum 1. A sheet material 10 formed in a roll like form is disposed on the rollers 3a in turnable condition. A worker can unwind the material 10 from the roll toward a direction rectangular to the axis of the drum 1. That is, in such a case that the reinforced rubber layer of the pneumatic rubber fender comprises a plurality of rubber sheet materials, for example, a first rubber sheet which forms a surface layer, second and third reinforced sheet materials and a fourth rubber sheet which forms an inside layer, these sheet materials are removed from the rolls thereof separately as hereinafter explained in detail.

Figure 3:
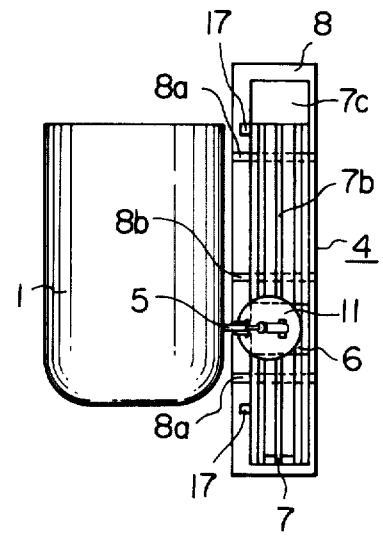
FIG. 3 is a schematic plan view of the stitching device shown in FIG. 2.
Figure 4:
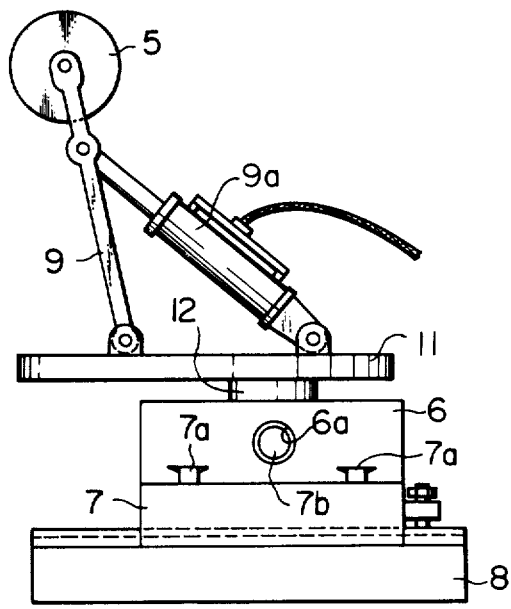
FIG. 4 is a side view of a pressing means utilized for the stitching device shown in FIGS. 2 and 3.
Figure 5:
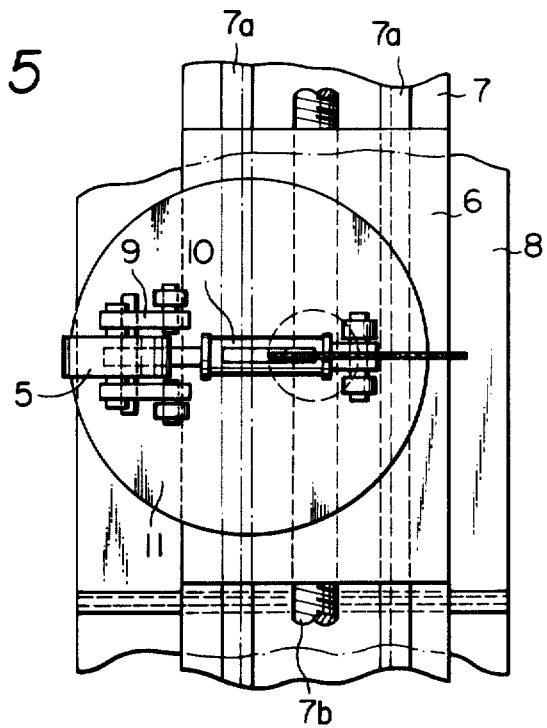
FIG. 5 is a plan view of a pressing means shown in FIG. 4.
Figure 6:
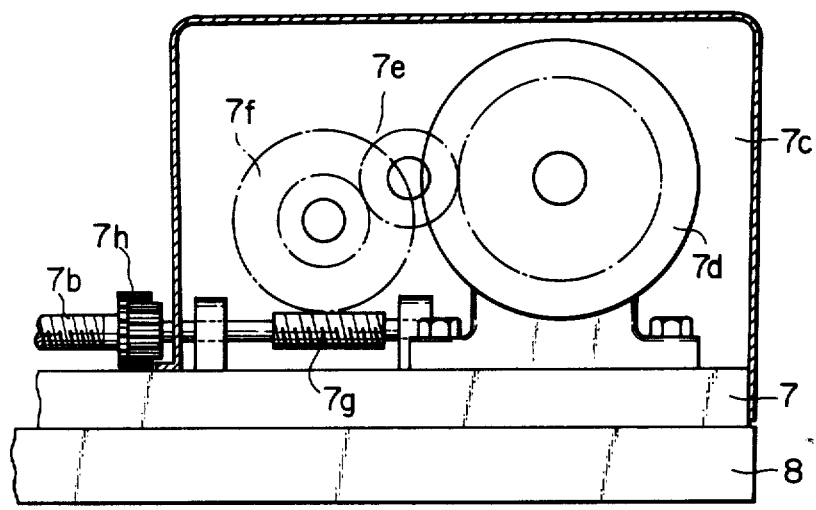
FIG. 6 is a schematic side view, partly in section of a driving mechanism utilized for the stitching device shown in FIGS. 2 and 3.

As illustrated in FIGS. 2, 3 and 4, the stiching mechanism 4 comprises a pressing roller 5, first and second shifting stands 6 and 7 and a base stand 8. The pressing roller 5 is pivoted on the top end of a swinging lever 9 to which a swinging movement is imparted by a cylinder mechanism 9a, and this swinging lever 9 is pivoted on one corner of a rotary disc 11 supported rotatably on the first shifting stand 6 through an eccentric shaft 12. The first shifting stand 6 is provided with two grooves formed at a bottom portion thereof in parallel condition, and into these two grooves are slidably engaged in devotail condition a pair of guide rails 7a secured on the second shifting stand 7 in parallel to the axis of the drum 1. Consequently, the first shifting stand 6 is capable of moving in parallel to the longitudinal axis of the drum 1. The first shifting stand 6 is also provided with a threaded aperture 6a passing therethrough at an intermediate portion between the above-mentioned two grooves in parallel condition to these grooves as shown in FIGS. 4 and 5. The second shifting stand 7 is provided with a threaded shaft 7b turnably mounted thereon. This shaft 7b extends in parallel to the guide rails 7a and engages into the threaded aperture 6a of the first shifting stand 6. Therefore, the first shifting stand 6 is capable of sliding on the guide rails 7a when the threaded shaft 7b is turned. The direction of the displacement of the first shifting stand 6 is decided by the turning direction of the threaded shaft 7b. The second shifting stand 7 is further provided with a driving mechanism 7c which drives the threaded shaft 7b. Referring to FIGS. 3 and 6, the driving mechanism 7c is mounted on an end portion of the second shifting stand 7. The driving mechanism 7c comprises a driving motor 7d, a worm wheel 7f which is driven by the motor 7d via first gearing mechanism 7e, a worm 7g driven by the worm wheel 7f and a second gearing mechanism 7h which transmits the driving power of the worm 7f to the threaded shaft 7b.

Figure 7:
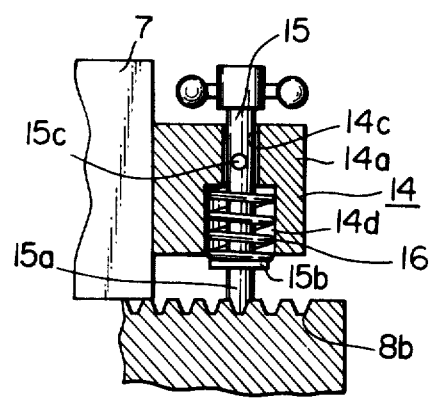
FIG. 7 is a cross-sectional side view of a stopper utilized for the stitching device shown in FIGS. 2 and 3.
Figure 8:
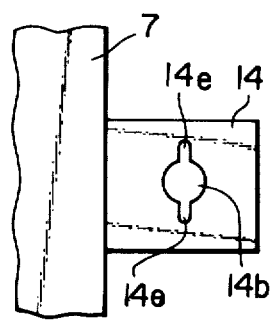
FIG. 8 is a plan view of a part of the stopper shown in FIGS. 2 and 3.

The second shifting stand 7 is capable of moving along a pair of guide rails 8a, laid on the base stand 8, to cross rectangularly the axis of the drum 1 so that the stand 7 can approach the drum 1 and move away therefrom. That is, the second shifting stand 7 is provided with a pair of grooves (not shown) formed at a bottom thereof in parallel condition and these two grooves are slidably engaged with the guide rails 8a in a devotail engagement. To fix the relative position of the second shifting stand 7 upon the base stand 8, a rack 8b is formed on the upper surface of the base stand 8, as shown in FIGS. 3, 7 and 8, at an intermediate portion between the two guide rails 8a and in parallel condition to these rails 8a. A stopper 14 is secured to a rear side, which is the side opposite that facing the drum 1, of the second shifting stand 7. The stopper 14 is provided with a bracket 14a secured to the rear side of the second shifting member 7 and a vertical aperture 14b composed of a top portion 14c and a bottom laterally expanded portion 14d. A stop pin 15 is held in the vertical aperture 14c in such a condition that the pin 15 is always urged downward by an expansion force created by a helical spring 16 disposed in the expanded portion 14d of the vertical aperture 14b. The herical spring 16 always urges a disc 15b secured to a bottom portion of the pin 15. Consequently, a bottom tip 15a of the pin 15 is capable of engaging into a teeth of the rack 8b. The pin 15 is provided with a pair of laterally projected pins 15c which are capable of sliding along a pair of vertical grooves 14e symmetrically formed at the top portion 14c of the vertical aperture 14b. Therefore, when the second shifting stand 7 is required to displace along the guide rails 8a, the pair 15 is pushed upward and the projected pins 15c temporarily rest on the upper surface of the bracket 14a so that the tip 15a of the pin 15 is disengaged from the rack 8b, whereby the second shifting stand 7 can be freely displaced along the guide rails 8a. When the relative position of the second shifting stand 7 on the base stand 8 is decided, the pin 15 is positioned in free condition so that the tip 15a thereof is engaged into the rack 8b and, accordingly, the second shifting stand 7 can be fixed on the base stand 8. A pair of limit switches 17 are disposed on both longitudinal end portions of the second shifting stand 7 as shown in FIG. 3. These limit switches 17 detect the arrival of the first shifting stand 6 and issue a signal to stop the rotation of the motor 7d (FIG. 6). For example, if either one of the limit switches 8a, detects the arrival of the first shifting stand 6, that limit switch 8a issues a signal to open the connection between an electric source and the motor 7d by way of a conventional magnet relay switch (not shown). Therefore, the displacing motion of the first shifting stand 6 on the second shifting stand 7 can be stopped at both terminals of the guide rails 7a. In this driving system, the turning direction of the threaded shaft 7b is changed by changing the polarity of the electric connection between the electric source and the motor 7d by a conventional relay switch (not shown), and this operation of the relay switch is carried out manually.

The angle of the movement of the swinging lever 9 by the pneumatic cylinder mechanism 10, the rotation angle of the rotary disc 11 and the movement of the first and second shifting stands 6 and 7, are driven and controlled by the above-mentioned control mechanism. As mentioned above, the pressing roller 5 of the stitching device 4 can be properly displaced on the peripheral face of the drum 1 from one end to the other end thereof while imposing a suitable pressure thereon.

Figure 9:
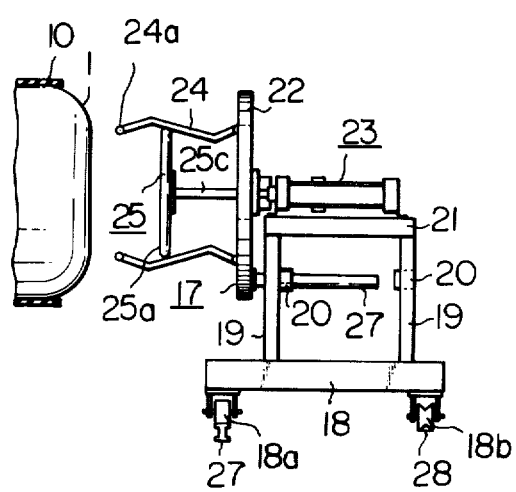
FIG. 9 is a schematic side view of a squeezing device shown in FIG. 1.
Figure 10:
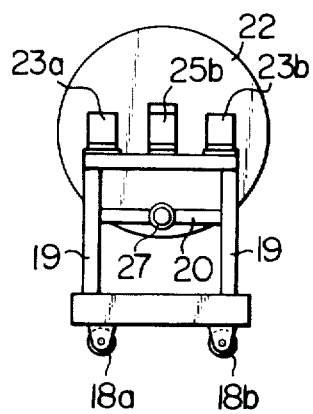
FIG. 10 is a schematic back view of the squeezing device shown in FIG. 9.
Figure 11:
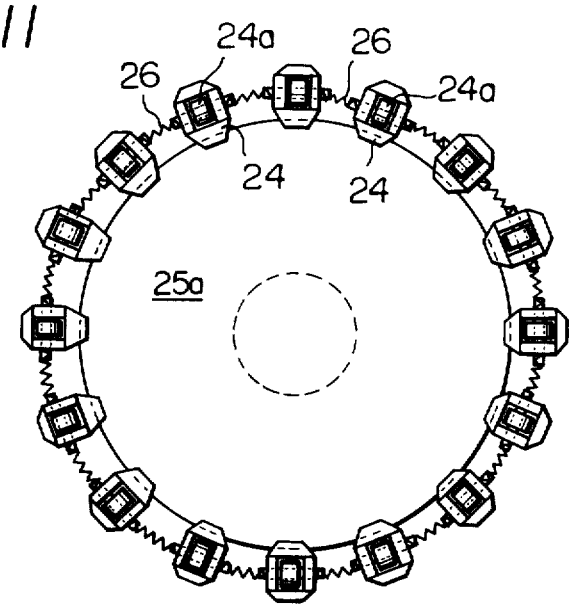
FIG. 11 is a front view of a part of the squeezing device shown in FIG. 9.

As shown in FIGS. 9, 10 and 11, the squeezing device 17 comprises a base frame 18, double pairs of upright pillars 19 connected by a plurality of horizontal frames 20, a horizontal supporting plate 21 mounted on the pillars 19, a disc 22 supported by a supporting mechanism 23 mounted on the supporting plate 21, a plurality of turnable arms 24 the bases of which are pivoted on the disc 22 at concentric circle positions thereof so that they are spaced from one another by a prescribed distance in the peripheral direction and that they can freely swing, and a control member 25 which controls the relative distance between two adjacent arms 24. The free and portions of each arm 24 supports a pressing roller 24a, and each two adjacent arms 24 are connected by a tension spring 26 as shown in FIG. 11. The supporting mechanism 23 comprises a pair of pneumatic cylinders 23a and 23b disposed on the supporting plate 21 in parallel condition. The disc 22 is secured to the respective free end portions of the piston rods of these pneumatic cylinders 23a and 23b. The control member 25 comprises a small disc 25a located in a space defined by the arms 24, as shown in FIG. 9, and a pneumatic cylinder 25b disposed on the supporting plate 21 in parallel condition to the pneumatic cylinders 23a and 23b. The piston rod 25c of the pneumatic cylinder 25b passes freely through the disc 22 at the central portion thereof and is connected to the central portion of the small disc 25a. Consequently, the small disc 25a is capable of displacing horizontally in a separate condition from the disc 22.

As shown in FIG. 9, each arm 24 is provided with an inside surface which contacts the circular edge of the small disc 25a, and a space formed by the above-mentioned inside surface of all arms 24 is reduced toward the disc 22. The small disc 25a is always positioned in concentric condition to the disc 22. Since all arms 24 are always forced to approach each other by the action of the springs 26, the above-mentioned inside surface of each arm 24 is always urged to the circular edge of the small disc 25a. Consequently, if the small disc 25a is displaced toward the disc 22, the intervened space between two adjacent arms 24 is enlarged. A horizontal guide bar 27 is slidably supported by the horizontal frame 20 and an end of this bar 27 is secured to a bottom portion of the disc 22 so that the horizontal disclacement of the disc 22 is stably assured. The base frame 18 is provided with a double pair of wheels 18a, 18b and they run along corresponding rails 27, 28, respectively. As already explained, the disc 22 is allowed to approach the end plate portion B of the drum 1 and separate therefrom by the driving action of a pair of cylinders 23a and 23b attached on the supporting plate 21.

As is illustrated in FIG. 12A, if the small disc 25a is drawn back by the cylinder 25b, the arms 24 are allowed spread in the radial direction and, hence, the springs 26 are expanded. When the cylinders 23a and 23b are actuated, the springs 26 are allowed to arrive at a prescribed position while having no contact with the body forming material 10. By the action of the cylinder 25b in pushing out the piston lever 25c, each roller 24a is pressed onto the circumference of the material 10. When the cylinders 23a and 23b are returned, as shown in FIG. 12B, the springs 26 are caused to perform the action of pressing the circumference of the material 10 uniformly and lapping it to the drum 1 along the circumferential configuration of the drum 1. The movable stand 18 is moved on running rails 27 and 28 laid on the floor, in the direction crossing rectangularly the axis of the drum 1 by means of a cylinder or a similar unit. From on experimental tests it was found that it is preferable that a large number of arms 24, for example 16, 18, 24 arms be utilized.

The centering device 30 has an attachment plate 31 for holding an end plate 32 as shown in FIG. 13. The attachment plate 31 is attached to a frame 33 swingably mounted on a truck 34 moving on the rails 27 and 28 and the plate 31 is capable of moving by action of pneumatic cylinder 35 so as to approach the end plate portion B of the drum 1 or separate therefrom. The frame 33 is allowed to perform an inclining movement by action of a pneumatic cylinder 36 through a link mechanism 37. As is illustrated in FIG. 14, the attachment plate 31 is provided with a sealed bag 38 capable of inflation, the outer periphery of which is air-tightly attached to the attachment plate 31. Further, the attachment plate 31 also includes supporting rod 31a and spring 31b for supporting a part of the end plate 32 turned back on the back surface of the attachment plate 31.

In the centering device 30, the end plate 32 is attached to the attachment plate 31. In order to facilitate the attachment operation, the attachment plate 31 is inclined by a certain angle by the action of the pneumatic cylinder 36 through the link mechanism 37, as indicated by a two-dot chain line in FIG. 13. After the plate 32 has been attached to the attachment plate 31 and held by turning the supporting rod 31a to a position indicated by a solid line in FIG. 14, the attachment plate 31 is returned to the original vertical position indicated by a solid line in FIG. 13. Then, the cylinder 35 is actuated to center the plate 32 with the end plate portion B of the drum 1, followed by pressing. After the plate 32 has been pressed on the end plate portion B of the drum 1, the supporting rod 31a is brought down to release its supporting action. Then, air is filled in the sealed bag 38 to inflate the sealed bag 38, as shown in FIG. 15, and the end plate 32 is molded into a drum-like shape.

The turn-back case 40 is a device for turning back a semi-finished product 41 (FIG. 16E), formed by closing one side on the drum 1, to a prescribed position by using air. This device will be hereinafter explained in detail. The product receiving stand 50 is a stand for receiving, as shown in FIG. 16H, a non-vulcanized fender proper 43 from the fabricating operation through a roller 51 when the fabricated fender proper 43 is taken from the drum 1. This stand 50 is used also for transportation of the fender proper 43.

The fabricating process according to the present invention will now be described by reference to the accompanying drawings of FIG. 16A through FIG. 16H. FIGS. 16A to 16H show respective steps of the fabricating process, namely the states of the pneumatic rubber fender proper 43 at respective steps of the fabricating process according to the present invention.

FIG. 16A shows the state where the first material, that is, the surface rubber layer 10a of the body portion of the rubber fender proper 43 and the surface rubber layer 32a of the first end plate 32, are formed on the drum 1. The surface rubber layer 32a is pressed and lapped to the end plate portion B of the drum 1 by means of the above-mentioned centering device 30. An adhesive is coated on the entire surface of the surface rubber layer 32a on the side of the drum 1, and the rubber layer 32a is closely stuck to the end plate portion of the drum 1. Then, the end portion of the surface rubber layer 10a of the body portion is removed from the roll of material by the material feed device 3 by turning the drum 1, pressed to the cylindrical portion A of the drum 1 and wound thereon by rotation of the drum 1. This end portion is then lap- or butt-bonded to form a cylinder. The surface rubber layer 10a of the body portion which has thus been formed into a cylindrical shape is uniformly drawn at the end portion on the side of the end plate portion B of the drum 1 by means of the above-mentioned squeezing device 17, and this end portion of the rubber layer 10a is lap-bonded to the end portion of the surface rubber layer 32a on the circumference of the drum 1. A powdery green parting agent capable of adhesion in the vulcanizing process, such as zinc stearate, is spread on an end portion C of the surface rubber layer 10a of the body portion. This parting agent spread to bond the body portion material 10 to the second end plate 45 (FIG. 16F), after the turning-back step described hereinafter. Since the materials of the surface layer 10a of the cylindrical body forming sheet material 10 and the first sheet elements of the end plates 32 and 52 are to form the outer surface of the rubber fender proper 43, it is preferred that rubber-materials having good abrasion resistance and good weather resistance be used as these materials.

FIG. 16B shows the state where a rubber-coated reinforced sheet of cord fabric 10b of the body material 10 and a rubber-coated reinforced cord layer 32b of the first end plate 32 are pressed on the surface rubber layers 10a and 32a formed on the drum 1. The end plate-reinforced sheet of cord fabric 32b is lapped and pressed on the surface rubber layers 10a and 32a by the centering device 6 in the manner already explained.

The rubber coated reinforced sheet 10b comprises a bias-cut cord fabric and this sheet 10b is taken from a rolled package thereof mounted on the material feed device 3. Then, the reinforced sheet 10b is pressed on the surface rubber layer 10a of the body portion by means of the action of the stitching mechanism 4 while turning the drum 1. Consequently, the reinforced sheet material 10b is fabricated into a cylindrical shape. According to the action of the squeezing device 17, the end portion of the cylindrical reinforced sheet material 10b is uniformly squeezed and lapped on the end portion of the end plate reinforced cord layer 32b so that these end portions of two materials 10b and 32b are press-bonded together. The other end portion D of the cylindrical reinforced sheet material 10b is treated in a manner similar to the end portion C of the surface rubber material 10a.

FIG. 16c shows the state where the second rubber-coated reinforced sheet material 10c of the body material 10 and a similar sheet material 32c of the first end plate 32 are pressed on the above-mentioned reinforced sheet materials 10b and 32b. The second end plate-reinforced sheet material 32c is pressed and bonded by the centering device in the same manner as the first end plate-reinforced sheet material 32b, but the cord direction of the sheet material 32c is deviated from that of the sheet material 32b by a certain angle. The second reinforced sheet material 10c is wound on the cylindrical surface of the first reinforced sheet material 10b and squeezed and press-bonded by the squeezing device 17. However, the second reinforcing sheet material 10c is wound at a bias angle of the cord fabric thereof opposite to the bias angle of the cord fabric of the first reinforced sheet material 10b and, in this state, the layer 10c is press-bonded. After this press-bonding operation, a powdery parting agent is spread on the part indicated by the letter E. These reinforced sheet materials 10c and 32c are each rubber coated cord fabric.

FIG. 16D shows the state where inside rubber layers are press-bonded and formed on the second reinforced sheet material 10c of the body material 10 and the sheet material 32c of the first end plate 32, which have been formed on the drum 1. The inside rubber layer 32d of the first end plate 32 is press-bonded on the second reinforced sheet material 32c by means of the centering device 30, and the inside rubber layer 10d taken from the feed device 3 is pressed on the cylindrical reinforced sheet material 10c and closely stuck thereon in a cylindrical form by the action of the stitching device 4 while rotating the drum 1. Thereafter, an end portion thereof, located at a side of the end plate portion B of the drum 1 (FIG. 1), is squeezed by the squeezing device 17 so as to press-bond it with the inside rubber layer 32d of the first end plate 32. Any air possibly remaining among the above-mentioned superposed sheets of materials is removed perfectly by the action of the stitching device 4 to attain the desirable good condition of press-bonding. It is necessary to patch the lapped portions and apertures so as to assure the air-tightness, and the patched portions are strongly pressed by a manual stitcher. Then a powdery parting agent is spread on the surface area of the whole cylindrical body so as to enable bonding after the turning-back operation and reduce the stickiness of the surface during the turning-back operation to facilitate this operation. It is preferable to use a rubber material having excellent air tightness as the material constituting the inside rubber layer.

FIG. 16E shows the state of a cylindrical half-finished product having one end closed, which has been prepared by the steps shown in FIGS. 16A to 16D, namely the state where the body portion 41 is turned back. The turn-back case 40 of a cylindrical form having one end closed is disposed on the body portion 41, and then end-separated respective layers 10a, 10b, 10c and 10d of the cylindrical body material 10 are uniformly turned up on the circumference of the opened edge portion of the turn-back case 40. The turn back portion of the body material 10 is clamped by a clamping member 43 whereby the above-mentioned turn back portion of the body material 10 is firmly held between the clamping member 43 and the opened edge portion of the turn-back case 40. Consequently, the inside chamber of the turn back case 40 is kept air-tight. Then, air is fed from an air supply opening 44 to elevate the air pressure in the inside chamber of the case 40, whereby the case 40 is gradually moved to the direction away from the drum 1. When the turn-back case 40 arrives at a predetermined position, the supply of air is stopped and the turn-back case 40 is dismounted, and respective layers 10a, 10b, 10c and 10d of the cylindrical body material 10 are turned up to effect turning-back of the half-finished product 41 as shown in FIG. 16F.

Figure 16G:
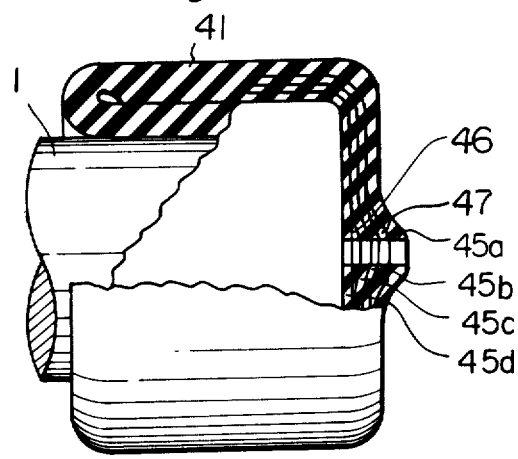
Figure 16H:
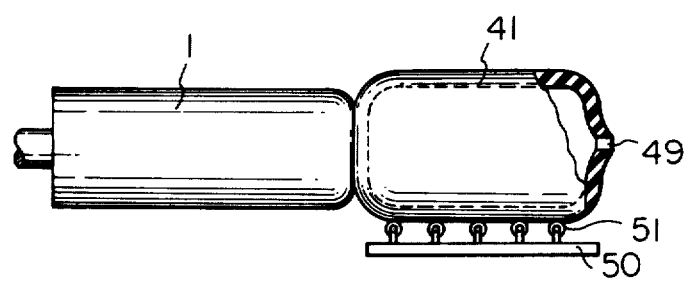

FIG. 16F shows the state after the above-mentioned turning-back operation and illustrates respective elements 45a, 45b, 45c and 45d of a second end plate 45 formed at the subsequent fabricating steps and mouth piece 46 and filter rubber 47 according to the assembling order. The inside rubber layer 45d of the second end plate 45 is attached to the centering device 30 and pressed to the end portion of the half-finished product 41, and the inside rubber layer 10d of the cylindrical body portion 10 is turned down on the end portion of the layer 45d and they are well press-lapped by a manual stitcher. The press-lapped areas of the inside rubber layer 10d of the cylindrical body portion 10 and the inside layer 45d of the end plate 45 are swabbed with a rubber volatile oil or the like to impart thereto a sufficient stickiness. Further, a powder parting agent is spread on the surface of the inside rubber layer 45d of the end plate 45 having contact with the half-finished product 41 to reduce the stickiness and prevent adhesion to the inside rubber. After that, lapped portions and apertures are patched to maintain air tightness of the product. The inside rubber layer 45d of the end plate 45 is made of the same rubber material as constitutes the inside rubber layers 10d and 32d and, prior to attachment, it is fabricated to have an identical shape to that of the end plate portion B of the drum 1 and an air supply aperture is formed at the center thereof. The rubber-covered mouth piece 46 is pressed to the inside rubber layer 45d of the end plate 45 so that it is well registered with the air supply hole. Then, by means of the squeezing device 17, the layer 10c which has been rendered sticky by application of a rubber volatile oil is turned down on the inside rubber layer 45d of the end plate 45 and the mouth piece 46, and the end plate-reinforced layer 45c is press-bonded by means of the centering device 30. Then, in the same manner, the sheet material 10b is turned down and the end plate-reinforced layer 45b is press-bonded thereon by the centering device 30. Then, the apertures are registered and the filler rubber 47 is press-bonded. After that the surface rubber layer 10a of the cylindrical body portion 10 is turned down and press-bonded onto the reinforcing sheet 10b and 45b by means of the squeezing device 17, and the surface rubber layer 45a of the end plate 45 is further press-bonded by using the centering device 30, whereby a non-vulcanized pneumatic fender proper, namely the product 41, is formed as shown in FIG. 16G.

Figure 17:
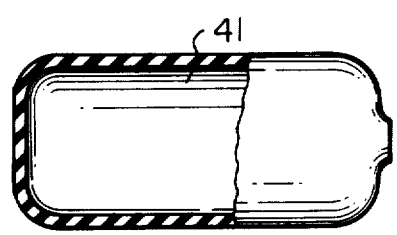
FIGS. 17 and 18 are partially sectional front views illustrating the product of the present invention before and after vulcanizing, respectively.
Figure 18:
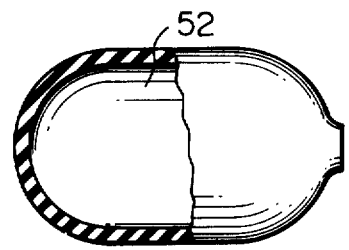

In the state shown in FIG. 16G, if the product receiving stand 50 is placed at a position indicated in FIG. 16H and air is supplied through a valve attachment aperture 49, the product 41 is reversed on a plurality of rollers 51 turnably mounted on the stand 50 as shown in FIG. 16H. In this state, the supply of air is stopped, and the non-vulcanized product 41 is transported to a stocking or vulcanizing process by means of the product receiving stand 50. When a predetermined pressure is applied to the interior of the non-vulcanized product 41 shown in FIG. 17 and vulcanization is conducted, the product 41 is vulcanized in an inflated condition, whereby a final product 52 shown in FIG. 18 is produced.

Figure 19:
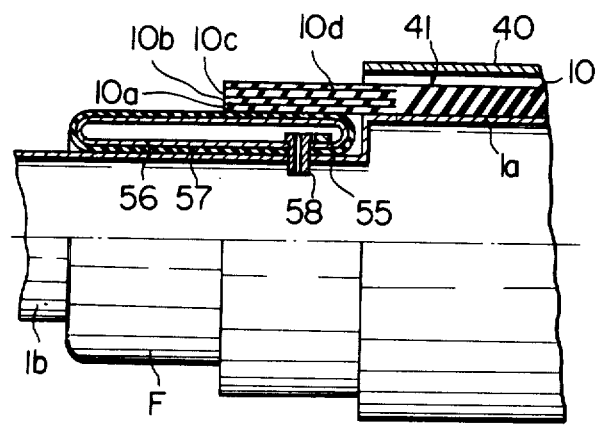
FIG. 19 is a front view showing the drum body in another embodiment, in which the upper half of the drum body is illustrated in section.
Figure 20A:
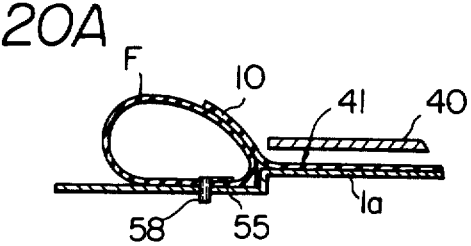
FIGS. 20A and 20B are views showing the step of turning back the body material by inflating the air bag.
Figure 20B:
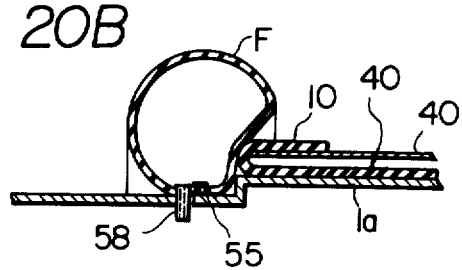

In the above-mentioned embodiment of a process for fabricatng the non-vulcanized pneumatic rubber fender, the turn-back operation of the sheet material is carried out manually. To save the manual labor costs of the above-mentioned turn-back operation shown in FIG. 16E, an automatic turn back system can also be utilized according to the present invention. Referring to FIGS. 19, 20A and 20B, the cylindrical portion A of the drum 1 (FIG. 1) for fabricating the cylindrical body portion 10 of a rubber fender comprises a large diameter portion 1a and a small diameter portion 1b. The portion adjacent to the end plate portion B (see FIG. 1) is the large diameter portion 1a and the portion distant from the end plate portion B is the small diameter portion 1b. A step is formed between the large diameter portion 1a and small diameter portion 1b. To this small diameter portion 1b an air bag F capable of inflation is fixed through a fixing band 55 at a position adjacent to the large diameter portion 1a. Formation of the large diameter and small diameter portions on the cylindrical portion of the drum 1 as illustrated in FIG. 19 is preferred for fabricating the body material, but separation of the cylindrical portion into such large diameter and small diameter portions is not particularly critical in the present invention.

The air bag F is a sealed bag capable of inflation and comprises an air-tight tube layer 56, a reinforced layer 57 lapped on the tube layer 56 to retain the inner pressure, a mouth piece 58 for supply and discharge of air and the above-mentioned fixing band 55. The reinforced layer 57 includes rubber-coated cord fabric, and in order that the sectional diameter be uniform, it is preferred that the aligning direction of the cords be in agreement with the radial direction. The fixing band 55 for fixing the air bag F to the drum 1 includes rubber-coated cord fabric arranged in a band-like form, and in order to prevent the band from expanding in the radial direction, it is preferred that the aligning direction of the cords be in agreement with the circumferential direction of the drum 1.

The body material 10 wound on the cylindrical portion A of the drum 1 and spread out on the air bag F is turned up on the turn-back case 40 as air is supplied through the mouth piece 58 attached to the air bag F and the air bag F is inflated as shown in FIGS. 20A and 20B. At this point, the air bag F is inflated with the fixing band 55 acting as the center of rotation. The air bag F may be constructed movably in the axial direction of the drum 1, so that it can be applied to production of fenders of the same diameter but different in length.

Figure 21:
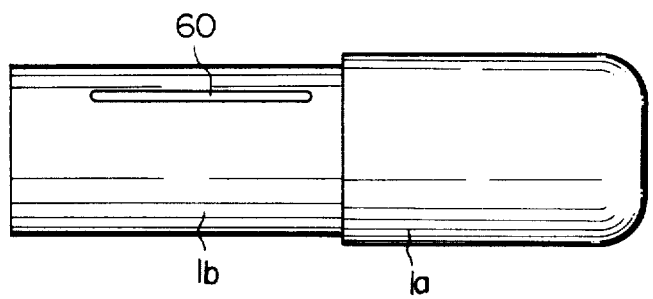
FIG. 21 is a front view showing the drum in which a long hole is formed in the reduced diameter portion.

In an embodiment shown in FIG. 21, a long slit 60 extending in the axial direction is formed on the small diameter portion 1b of the drum 1. The mouth piece 58 of the air bag F for supply and discharge of air is engaged with this long slit 60, so that the air bag F can move along this long slit 60. Therefore, such a drum 1 is useful to produce several different products having different longitudinal size but identical diameter.

Figure 22:
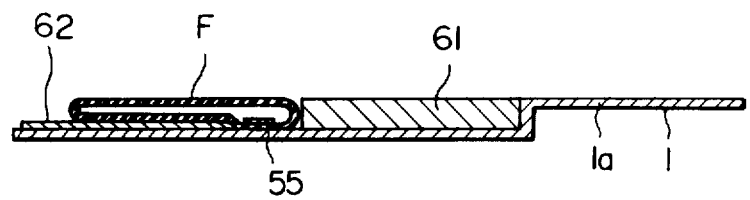
FIG. 22 is a view illustrating the operation of shifting the air bag.

FIG. 22 illustrates the state where the air bag F is moved on the drum 1 to a point distant from the large diameter part 1a. Reference numeral 61 indicates a filler member for the embedding of the small diameter part 1b. This filler member 61 is formed by molding and processing a metal or plastic material into a ring-like form in agreement with the outer diameter of the small diameter portion, and it is split into 3 or 5 pieces so as to facilitate the dismounting thereof. When turning-up of the body material is performed by using an air bag positioned in this manner, a metal fitting 62 is preferably mounted to fix the position of the air bag.

EXAMPLE

A pneumatic rubber fender was produced having the following dimensions by utilizing the sheet materials shown.

| Dimension | Thickness | Material |
|---|---|---|
| Surface layer | 5 m/m | rubber |
| First reinforced layer | 1.2 m/m | rubber coated cord fabric |
| Second reinforced layer | 1.2 m/m | cord fabric |
| Inside layer | 3 m/m | rubber |

The first and second reinforced layer were of a rubber coated cord fabric which was made from 3 ply of 1000 denier yarns (total denier 3000 denier), the number of ends of the cord fabric was 50 ends/5 cm. The bias angle of the cord against the lengthwise direction of the first and second layer materials was 50°. However, a bias angle in a range between 15° and 54° may be applied. During the fabricating operation, it was confirmed that compressed air having a pressure in a range between 0.05 and 0.1 kg/cm² was sufficient to remove the turn back case from the drum in the process shown in FIG. 16E. It was also confirmed that the fabricating operation for producing the nonvulcanized pneumatic rubber fender could be carried out with high working efficiency and very easily, in comparison with the conventional manual process.

What is claimed is:

1. A process for fabricating a pneumatic rubber fender comprising:
    1. a first step of forming a main body of said non-vulcanized pneumatic rubber fender provided with a cylindrical body portion and a first end plate closing an end of said cylindrical body portion on a fabrication drum provided with a cylindrical portion and an end plate portion closing one end of said cylindrical portion;
    2. a second step of disposing on the opened end portion of said cylindrical body portion, a cylindrical turn back case, which is closed at a longitudinal edge of one end and opened at the longitudinal edge of the other end, and is provided with an air supply opening thereafter, turning on and fixing the open edge portion of said cylindrical body portion on the circumference of said open edge of said turn back case in air tight condition, next, supplying air into said turn back case through said air supply opening so as to relatively retract said turn back case from said fabrication drum and turn back said open edge of said cylindrical body toward said first end plate;
    3. a third step of applying a second end plate having a valve attachment at a central portion thereof onto said end plate portion of said fabrication drum by way of said first end plate and bonding a peripheral edge portion of said second end plate with said turned back edge of said cylindrical body so that a non-vulcanized fender proper in partly turned back condition is formed on said fabrication drum;
    4. a fourth step of withdrawing said non-vulcanized fender proper in partly turned back condition from aid fabrication drum;
    5. a fifth step of vulcanizing said non-vulcanized rubber fender proper.

2. A process for fabricating a pneumatic rubber fender according to claim 1, wherein said main body is formed by a plurality of component rubber and reinforced rubber sheet materials which is provided with a plurality of cords, each having a bias angle between 15° and 54° from the lengthwise direction of the rubber fender, said second end plate is formed by the component sheet materials similar to said main body, each of the component sheet materials of said second end plate is press bonded with a turned back free edge portion of a corresponding sheet material of said main body in said third step.

3. A process for fabricating a pneumatic rubber fender according to claim 2, wherein said first step for forming a main body of said non-vulcanized pneumatic rubber fender comprises a plurality of unit operations, a first unit operation carried out to form an outside layer from a rubber sheet material, a second unit operation carried out to form a reinforced layer of a cord fabric coated with rubber on said outside layer, a third unit operation carried out to form an inside layer from a rubber sheet material, said three layers are press-bonded to each other, each of said three unit operations is carried out by the successive steps of (a) applying a body constituting sheet material to said cylindrical portion of said fabrication drum and forming a cylindrical layer of said sheet material, (b) squeezing an end portion of said cylindrical layer of said sheet material onto said end plate portion of said fabrication drum, (c) applying an element of a first end plate made from said sheet material to said end plate portion of said fabrication drum, (d) press bonding a peripheral edge portion of said element onto said squeezed end portion of said cylindrical layer of said sheet material.

4. A process for fabricating a pneumatic rubber fender acording to claim 3, further comprising at least one additional unit operation which is identical to said second unit operation between said second and third unit operations.

5. An apparatus for fabricating a pneumatic rubber fender, comprising:
    a fabrication drum having a cylindrical portion for forming a main body of a non-vulcanized pneumatic rubber fender and an end plate portion formed on one end of said cylindrical portion for forming a first end plate of said non-vulcanized pneumatic rubber fender, and an annular air bag coaxially fixed on a cylindrical part of said cylindrical portion, said air bag having a capability of turning back a free end portion of said main body of said non-vulcanized rubber fender;
    a mechanism for rotating said fabrication drum about a longitudinal axis thereof;
    a material feed device for supplying a body-constituting sheet material onto said fabrication drum;
    a stitching mechanism for pressing said body-constituting sheet material onto said fabrication drum so as to form a cylindrical layer of said sheet material on said cylindrical portion of said fabrication drum;
    a device for squeezing an end portion of said cylindrical layer of said sheet material onto said end plate portion of said fabrication drum;
    a centering device for pressing an element sheet of said end plate onto said end plate portion of said fabrication drum;
    a turn back cylindrical case for turning back a cylindrical body portion of said non-vulcanized pneumatic rubber fender formed on said fabrication drum, said turn back case comprising a cylindrical body portion, an opened end portion and a closed end portion, the inside diameter of said cylindrical body portion being slightly larger than the outside diameter of said cylindrical body portion of said fender;

means for air tightly clamping said free end portion of said main body of said non-vulcanized rubber fender after being turned back on said turn back case;

means for supplying air into said turn back case, whereby when air is supplied into said turn back case, said turn back case is displaced away from said fabrication drum along a longitudinal direction of said fabrication drum.

6. An apparatus according to claim 5, wherein said fabrication drum is provided with a large diameter cylindrical portion and a small diameter cylindrical portion, said large diameter cylindrical portion is formed at a position adjacent to said end plate portion, while said small diameter cylindrical portion is formed at a position far from said end plate portion, an annular step is formed between said two portions, said small diameter portion is provided with a ring shaped air bag mounted thereon in slidable condition, and said air bag is capable of inflation when compressed air is supplied therein.

7. An apparatus according to claim 5, wherein said fabrication drum is provided with a large diameter cylindrical portion and a small diameter cylindrical portion, said large diameter cylindrical portion is formed at a position adjacent to said end plate portion, while said small diameter cylindrical portion is formed at a position far from said end plate portion, an annular step is formed between said two portions, said small diameter portion is provided with a slit formed along the longitudinal axis thereof and also provided with a ring shaped air bag slidably mounted on said small diameter portion, and by means of a fixing band said air bag is provided with a mouth piece passing through said slit and is capable of inflation when compressed air is supplied therein through said mouth piece.

8. An apparatus according to claim 5, wherein said squeezing device comprises a base frame and a main frame formed on said base frame, a pair of pneumatic cylinders mounted on a horizontal portion of said main frame in parallel condition, a disc rigidly supported by free ends of pistons of said pneumatic cylinders in vertical condition, a plurality of turnable arms the bases of which are pivoted on said disc at concentric circle positions thereof so that they are spaced from one another by a predetermined distance in the peripheral direction and that they can freely swing, means for controlling the relative distance between two adjacent turnable arms, said control means comprises a vertical small disc located in a space defined by said turnable arms and an additional pneumatic cylinder disposed on said horizontal portion of said main frame in parallel condition to said two pneumatic cylinders in such a condition that a central portion of said vertical small disc is connected to a free end of a piston of said additional pneumatic cylinder, said turnable arms are elastically connected by a plurality of helical springs connecting each pair of two adjacent turnable arms so that each of the turnable arms is always urged to the edge of said small disc, a space formed by said turnable arms is reduced toward said disc, each of said turnable arms is provided with a roller rotatably mounted on a free end portion thereof.

9. An apparatus according to claim 5, wherein said centering device is provided with a disc like attachment plate comprising a supporting rod and a sealed bag capable of inflation for urging said end plate against an edge portion of said cylindrical body portion of the non-vulcanized pneumatic rubber fender formed on said fabrication drum, said attachment plate is mounted on a frame, the position of said frame is adjustable by means of a pneumatic adjusting cylinder, whereby a center of said attaching plate can be positioned at a position which coincides with an axial line of said fabrication drum.

10. An apparatus according to claim 5, wherein said annular air bag is made of rubber sheet comprising superimposed layers of air tight tube layer(s) and reinforced layer(s), and is provided with a mouth piece for supplying air thereinto whereby said air bag is inflated, a part of said air bag is secured to a part of said fabricating drum in such a condition that the other free portion of said air bag is capable of sliding on said fabricating drum when it is inflated.

* * * * *